United States Patent
Chintagunta et al.

(10) Patent No.: US 11,340,992 B2
(45) Date of Patent: May 24, 2022

(54) REPRESENTING UPDATE RESULTS OF FIRMWARE UPDATES

(71) Applicant: HEWLETT PACKARD ENTERPRISE DEVELOPMENT LP, Houston, TX (US)

(72) Inventors: Murali Mohan Chakravarthy Chintagunta, Bangalore (IN); Mohanapriya Rathinasamy, Bangalore (IN); Prasanna Sheshagiri Bhat, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/700,477

(22) Filed: Dec. 2, 2019

(65) Prior Publication Data

US 2021/0165714 A1    Jun. 3, 2021

(51) Int. Cl.
| G06F 9/445 | (2018.01) |
| G06F 11/14 | (2006.01) |
| G06F 9/54 | (2006.01) |
| G06F 8/65 | (2018.01) |
| G06F 11/07 | (2006.01) |

(52) U.S. Cl.
CPC ............ G06F 11/1433 (2013.01); G06F 8/65 (2013.01); G06F 9/542 (2013.01); G06F 11/0772 (2013.01); G06F 11/1435 (2013.01)

(58) Field of Classification Search
CPC ........ G06F 11/1433; G06F 8/65; G06F 9/542; G06F 11/0772; G06F 11/1435
USPC ................................................... 717/168–178
See application file for complete search history.

(56) References Cited

U.S. PATENT DOCUMENTS

| 7,761,556 B2 | 7/2010 | Mills et al. |
| 8,271,417 B2 | 9/2012 | Kuchibhotla et al. |
| 8,856,774 B1 * | 10/2014 | Kulaga ................ G06F 11/368 717/168 |
| 9,477,543 B2 | 10/2016 | Henley et al. |
| 10,263,803 B2 * | 4/2019 | Ansari ................ H04L 67/141 |
| 2016/0196132 A1 * | 7/2016 | Searle .................. H04L 41/082 717/173 |

OTHER PUBLICATIONS

Freyja, "Raygun's Dashboard: Spot Performance Problems and Get Data Quickly," Apr. 24, 2014, pp. 1-12, Raygun, Retrieved from the Internet on Nov. 6, 2019 at URL: <raygun.com/blog/dashboard/>.
Microsoft, "Monitoring," Oct. 16, 2019, pp. 1-7, Retrieved from the Internet on Nov. 6, 2019 at URL: <docs.microsoft.com/en-us/azure/architecture/framework/resiliency/monitoring>.

* cited by examiner

*Primary Examiner* — Chuck O Kendall
(74) *Attorney, Agent, or Firm* — Trop, Pruner & Hu, P.C.

(57) ABSTRACT

Examples may represent update results of installation of firmware updates of a firmware bundle on a hardware resource. Examples include determining, from an update result, whether the installation of a firmware update on a component of the hardware resource is failed or succeeded to identify a failed component or a successful component, and representing the failed component or the successful component.

20 Claims, 4 Drawing Sheets

REPRESENTING UPDATE RESULTS OF FIRMWARE UPDATES

BACKGROUND

Various hardware resources, for example, servers, storage, network systems etc. in a datacenter generally include different components, such as input/output (I/O) cards, Basic Input/Output System (BIOS), and device drivers. Each component generally contains a firmware to control the functionality of the component. Different components of the hardware resources may be updated with new versions of firmware (i.e., firmware updates) from time to time. Accordingly, a manufacturer or a hardware vendor may release firmware updates to provide additional functionalities, rectify any problem or improve performance of the components.

BRIEF DESCRIPTION OF THE DRAWINGS

For a more complete understanding of various examples, reference is now made to the following description taken in connection with the accompanying drawings in which the same numbers are used throughout the drawings to reference like features and components.

DETAILED DESCRIPTION

Figure 1:
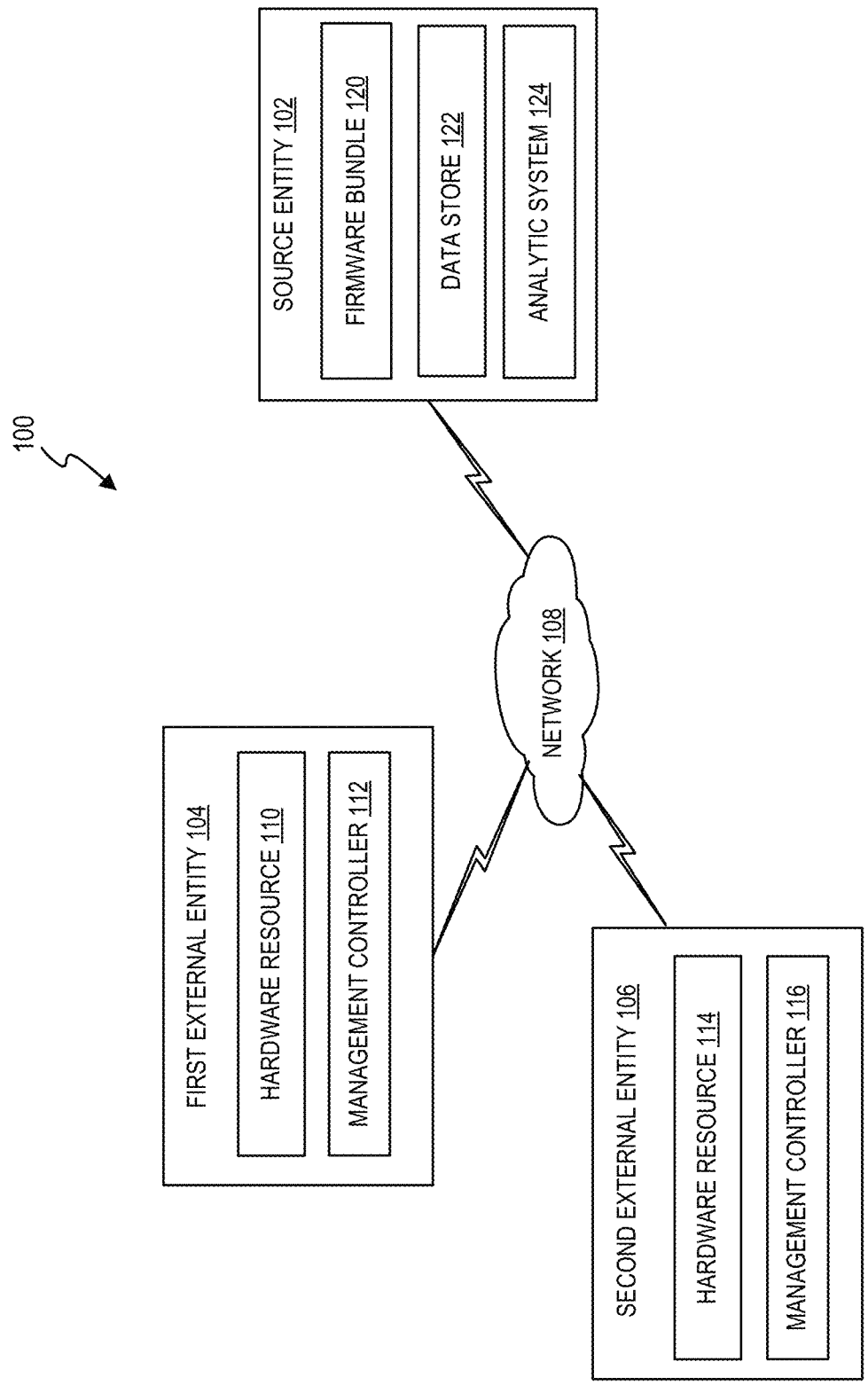
FIG. 1 is a schematic block diagram of an example computing environment including a plurality of external entities, each including hardware resources and a source entity including an analytic system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "associated," as used herein, is defined as connected or coupled, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise Within the life time of hardware resources such as servers, storage devices etc., many new versions of firmware and drivers (i.e., firmware updates) may be released by independent hardware vendors (IHVs) and original equipment manufacturers (OEMs) which may include important updates or patches. Different organizations may install such firmware updates to keep their hardware resources up-to-date with the new versions of the firmware and drivers. Therefore, installation of these firmware updates on hardware resources in organizations may not be a onetime activity but a periodic maintenance activity.

As used herein, the term "firmware update" may refer to a new version of a firmware or a driver (i.e., driver update) or any other suitable code that is executed to perform desired functionalities. It would be understood that for installing a firmware update on a component (that has to be updated), a firmware package is processed to copy the payload bits (also referred to as firmware bits) of the new version of firmware or the driver to the component. Furthermore, it would be understood that for a firmware update, the firmware image may be utilized by the component; and for a driver update, a patch may be installed by the component. Installation of a firmware update on a hardware resource, as used herein, may mean that a new version of a firmware or a driver (i.e., firmware updates) may be installed on the component of the hardware resource.

In a datacenter, various components of hardware resources may have many firmware updates including, but not limited to, BIOS updates, management firmware updates, I/O firmware image updates, provider agent updates, and device driver updates. To manage such different types of updates in the datacenter, management controllers are generally implemented by organizations which provide out-of-band management capabilities, such as installation of a new version of firmware and driver onto a component of a hardware resource without actively utilizing resources of the hardware resource.

Developing and installing a firmware update may be a complex, error-prone process. Furthermore, the process of installing the firmware update on a component of a hardware resource and activating firmware bits on the component needs a down time. In some scenarios, a firmware bundle including various firmware updates for various components of a hardware resource may be released by a hardware vendor or a manufacture. These firmware updates of the firmware bundle may be installed on respective components of a hardware resource, for example, a server at various external entities. In some examples, installation of a firmware update (in the firmware bundle) on a component of a hardware resource may fail depending on various factors for example, different configuration of the component (which may not be tested for the firmware update by the hardware vendor or the manufacturer), the hardware resource may not be in a suitable state due to some issue, and the component may not be valid (for example, having invalid signature), etc. These instances of failure of the installation should be reported and resolved on priority. However, the process for reporting such instances and resolving the issues may take days to months. The time taken to report an instance and resolve the issue sometimes may be attributed to time spent in dealing with the suppliers and sub-vendors of the components which were assembled in the shipped actual hardware resource, analyzing the issue, receive a final resolution from the manufacturer etc. Furthermore, in some examples, the same issues may be reported by multiple customers with similar kinds of errors. Analyzing and identifying similar issues may further take a huge amount of time. Similar other factors may add to the delay of identifying the issues and resolving them. Such delays may lead to disappointments for customers due to increased down time and cause a decrease in customer's satisfaction.

As discussed, the installation of a firmware update on a respective component may fail or succeed. That is, the firmware of the component may or may not be updated with the new version of the firmware after the execution of the installation of the firmware update. In one example, the firmware of the component may not be updated with the new version of the firmware and the component may not have an updated firmware. That is, the firmware update of the component may be failed. In another example, the firmware of the component may be updated with the new version of the firmware and the component may have an updated firmware. In these instances, the firmware update of the component may be successful. Based on whether a component may or may not have an updated firmware after the installation, a status of the component may be successful or failed. As used herein, the term "status of a component" may refer to a state of the component (i.e., whether the component may or may not have an updated firmware) after the execution of the installation of a firmware update on the component. Based on whether the installation of a firmware update on a component may be failed or successful after the execution of the installation, a status of the firmware update may be failed or successful.

In the examples, when installation of a firmware update on a respective component is failed, it may be referred to as "failed update of the component." In such examples, the firmware of the component may not be updated and the status of the component may be failed and the component may be referred to as "failed component." Further, in these examples, a status of the corresponding firmware update may be failed and the firmware update may be referred to as "failed firmware update." In some examples, when installation of a firmware update on a respective component is succeeded, it may be referred to as "successful update of the component." In such examples, the firmware of the component may be updated and the status of the component may be successful and the component may be referred to as "successful component." In these examples, the status of the corresponding firmware update may be successful and the firmware update may be referred to as "successful firmware update."

Examples described herein provide systems and techniques that may enable representation, in particular, automatic representation of update results of installation of firmware updates of a firmware bundle, provided by a hardware vendor or a manufacturer, on respective components of one or more hardware resources. As used herein, representation of an update result may include representation of an outcome of the update result, and representation of update results may include representation of a collective outcome (i.e., combination of various outcomes) of the update results. In examples described herein, the update results of installation of firmware updates may be received from one or more external entities (for example, various customers) and analyzed to determine the status of the components after the execution of the installation to provide outcomes of the update results. Such outcomes may be represented to show status of various components after the installation of firmware updates. For example, the representation may show failed components with respect to successful components. Such representation of the update results may help in identifying status (i.e., failed or successful) of corresponding firmware updates and visualizing overall quality of the firmware bundle.

Some examples described herein provide real-time representation of updates results of the installation of various firmware updates. Furthermore, in case of a failed component, one or more of information including a number of instances of failure of the installation of a firmware update on the component, a failure log for each instance of failure or a reason of failure for each instance may further be represented. This information would be helpful for hardware vendors or manufacturers to identify issues occurred while installing the firmware updates, and resolve them prior to the reporting of the issues. Furthermore, vendors or manufacturers may anticipate issues that may occur while installing the firmware updates by another external entity before installing the firmware updates, and provide suitable resolution for the issues. Some examples described herein provide systems and techniques that may allow informing (for example, alerting) other external entities about a failed firmware update in the firmware bundle while or before the other external entities select the firmware bundle for installing firmware updates. Providing such information and, in some examples, suitable resolution such as customer advisory beforehand, would be helpful for other external entities to visualize quality of the firmware bundle and select it for the installation of firmware updates.

Thus, as described herein, the present subject matter provides systems and methods that may (i) enhance vendor's productivity by reducing overall turnaround time and human effort and (ii) reduce down time for installation of firmware updates which leads to customer's satisfaction.

In an aspect, the present subject matter relates to a method for representing update results of installation of a firmware bundle on a hardware resource. In particular, the installation of the firmware bundle on the hardware resource may include installation of a plurality of firmware updates on a plurality of components of the hardware resource. The described method may include retrieving an update result of installation of a firmware update of the firmware bundle on a component of a hardware resource located at a first external entity. The update result may include metadata of each instance of failure or success of the installation of the firmware update on the component. The method may further include determining, from the update results, whether the installation of the firmware update on the component is failed or succeeded to identify a failed component or a successful component. Further, the method may include representing the failed component or the successful component. In some examples, in response of determining that the installation of the firmware update on the component is failed, the method may represent one or more of information including a number of instances of failure of the installation of the firmware update on the component, a failure log for each instance of failure or a reason of failure for each instance. In some examples, the method may be performed by an analytic system. In some examples, in response of determining that the installation of the firmware update on the component is failed, the method may include informing about the failure of the installation of the firmware update, to a second external entity, while or before selecting, by the second external entity, the corresponding firmware update for installation.

In an aspect, an analytic system may include a processing resource and a non-transitory processor readable medium encoded with instructions of an analytic application executable by the processing resource to cause the processing resource to retrieve, from a data store, an update result of installation of a firmware update on a component of a hardware resource located at a first external entity. The update result may include metadata of each instance of failure or success of the installation of the firmware update on the component. The instructions executable by the processing resource may further cause the processing resource to determine, from the update result, whether the installation of the firmware update on the component is failed or succeeded to identify a failed component or a successful component and represent the failed component or the successful component. The instructions executable by the processing resource may further cause the processing resource to represent one or more of information including a number of instances of failure of the installation of the firmware update on the component, a failure log for each instance of failure or a reason of failure for each instance, in response of determining that the installation of the firmware update on the component is failed.

The described systems and methods may be utilized for various firmware bundles and various external entities. Although the description herein is presented for installing a firmware bundle on a hardware resource such as a server in a datacenter, the methods and described techniques may be implemented for other devices, albeit with a few variations. Various implementations of the present subject matter have been described below by referring to several examples.

The above systems and methods are further described with reference to FIGS. 1-5. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1 schematically illustrates a block diagram of an example computing environments 100, according to an example of the present subject matter. The computing environment 100 may either be a public distributed environment or a private closed computing environment. As illustrated in FIG. 1, the computing environment 100 includes a source entity 102 that communicates with a plurality of external entities, for example, a first external entity 104 and a second external entity 106. As described herein, the plurality of external entities may be end users of hardware resources, for example, hardware resources 110 and 114. In an example, the plurality of external entities may include customers that use the hardware resources. In an example, the first external entity 104 may include the hardware resource 110 and a management controller 112, and the second external entity 106 may include the hardware resource 114 and a management controller 116 in their datacenters. In some other examples, the first and second external entities (104, 106) may independently include various hardware resources. A source entity for example the source entity 102 may be an original manufacturer, an entity hosted by an original manufacturer, a reseller or a hardware vendor of hardware resources, for example the hardware resources 110 and 114. In some examples, the source entity 102 may be associated with an independent vendor of the hardware resources 110 and 114. In some other examples, the source entity 102 may be associated with an independent service provider, such as an authorized reseller of hardware resources or an authorized vendor to provide update services to hardware resources. In an example, a firmware bundle 120, a data store 122 and an analytic system 124 may present at the source entity 102.

In an example, various components of the computing environment 100 may be communicatively coupled to one another via a network 108 such as wired or wireless network. In examples described herein, the network 108 may include, for example, a local area network (LAN), a virtual LAN (VLAN), a wireless local area network (WLAN), a virtual private network (VPN), the Internet, or the like.

Various components of the first external entity 104 and the second external entity 106, for example, the management controllers (112, 116) and the hardware resources (110, 114) may individually include processor(s) (not shown) to run an operating system, other applications or services. The processor(s) of each management controller (112 and 116) and the processor(s) of the hardware resources (110, 114) may be implemented as microprocessor(s), microcomputer(s), microcontroller(s), digital signal processor(s), central processing unit(s), state machine(s), logic circuit(s), and/or any device(s) that manipulates signals based on operational instructions. Among other capabilities, each processor may fetch and execute computer-readable instructions stored in a memory. The functions of the various 'processor(s)' may be provided through the use of dedicated hardware as well as hardware capable of executing machine readable instructions.

A hardware resource may be one or more software or hardware modules of at least one computing device or system, or any resource, component, or subsystem of that at least one computing device or system. In an example, a hardware resource for example, the hardware resource 110 and 114, may include one or more resources such as processing resources (e.g., central processing units, graphics processing units, microcontrollers, application-specific integrated circuits, programmable gate arrays, and/or other processing resources), storage resources (e.g., random access memory, non-volatile memory, solid state drives, hard disk drives HDDs, optical storage devices, tape drives, and/or other suitable storage resources), network resources (e.g., Ethernet, IEEE 802.11 Wi-Fi, and/or other suitable wired or wireless network resources), I/O resources, and/or other suitable resources. In an example, a hardware resource may be deployed on a dedicated premise infrastructure, for example, an on-premise datacenter. In another example, a hardware resource may be deployed on a remote infrastructure, for example cloud datacenter. In some examples, a hardware resource may be deployed on a hybrid datacenter. An example of the hardware resource may include a server, a storage device or a networking device. In some examples, different firmware bundles may be provided for different hardware resources. A hardware resource may include a plurality of components, each including their own firmware. A firmware may be a combination of hardware and executable instructions that control various functionality of a component. Various examples of the components of a hardware resource (for example, the hardware resource 110 and 114) may include, but are not limited to, input/output (I/O) cards, Basic Input/Output System (BIOS), Network Interface Card (NIC), broadband management controller (BMC), smart array, power management and device drivers. In an example, the hardware resource 110 and the hardware resource 114 may be identical, and may include identical components.

In an example, the source entity 102 may provide a firmware bundle 120 including a plurality of firmware updates that may be installed for updating firmware of the plurality of components of the hardware resources 110 and 114. During the execution of the installation, when the firmware bundle 120 is provided for updating firmware of the components in a hardware resource for example the hardware resource 110, each firmware update of the plurality of the firmware updates may be installed on respective component i.e., firmware bits may be copied and activated on the respective components of the hardware resources 110. Installation of the plurality of firmware updates in the firmware bundle 120 for updating firmware of the plurality of components of the hardware resource 110 may be referred to as installation of the firmware bundle 120 on the hardware resource 110 or updating the hardware resource 110. In examples where the hardware resource 110 is identical to the hardware resource 114, same firmware bundle for example the firmware bundle 120 may be used for updating the hardware resource 114.

The management controllers 112 and 116 may be implemented, respectively, at the datacenters of the first external entity 104 and the second external entity 106. In some examples, the management controllers 112 and 116 may be independently implemented by the source entity 102 while implementing the hardware resources 110 and 114. Each management controller 112 and 116 may be a computing device for monitoring and controlling, respectively, overall functionalities of the hardware resources 110 and 114 and installation of firmware updates on various components of the hardware resources 110 and 114 from time to time. Each management controller 112 and 116 may be pre-configured, respectively, with the firmware updates based on the components of the hardware resources 110 and 114 or the plurality of firmware updates (i.e., the firmware bundle 120) provided by the source entity 102 for updating the hardware resources 110 and 114. Further, the management controllers 112 and 116 may also include different update policies defined by administrators for the purpose of updating components of the hardware resources 110 and 114.

Each management controller 112 and 116 may also store an update result of the installation (i.e., after the execution of the installation) of a firmware update of the plurality of firmware updates in the firmware bundle 120, respectively, on the hardware resource 110 and the hardware resource 114. As described herein, it is to be understood that in some examples, the management controllers 112 and 116 may, independently, store each update result of the installation of a firmware update of the plurality of firmware updates on the respective component of the hardware resources 110 and 114. Moreover, each update result may be stored after execution of the installation of the respective firmware update. According to an example of the present subject matter, the management controllers 112 and 116 may also send the respective update result(s) to the source entity 102. In one example, the update result(s) may be sent to the data store 122 via a Remote Device Access (RDA) support application.

During the execution of the installation of the firmware update, the installation of the firmware update on a component may fail or succeed. That is, an attempt for the installation of the firmware update on the component may be a failure or a success. An attempt for the installation of a firmware update on a respective component of a hardware resource may be referred to as an instance. In some examples, the installation of the firmware update may be successful in one attempt. In some examples, the installation of the firmware update may be successful after making more than one attempts. In these examples where the installation of the firmware update on the component is successful after making one or more attempts, the status of the firmware update may be successful. In said examples, the status of the component may be successful. In some other examples where the installation of the firmware update on the respective component may not be successful after making one or more attempts, the status of the firmware update may be failed. In these examples, the status of the component is failed.

In examples described herein, the update result may include metadata of each instance of failure or success of the installation of a firmware update on a respective component of the hardware resource (i.e., the hardware resource 110, the hardware resource 114 or both). In one example, the metadata for each instance of failure or success may include a corresponding log i.e., a failure log or a success log. Each log may include details of the respective instance i.e., details of the respective attempt of the installation of a firmware update on a respective component. Such details may include metadata of the respective component, details of firmware of the component, details of firmware update, timestamp of the instance, a reason of failure of an instance and the like. The metadata of a component may include one or more information including name of the component (i.e., Device ID), type of the component (i.e., Device class), the make of the component (i.e., Vendor ID), the version of the component etc. and the status of the component. In one example, the metadata of a component may include unique identification of the component, for example, Global Unique Identification Decimal (GUID) that includes a combination of Device class, Vendor ID, and device ID.

Referring to FIG. 1, as described, the source entity 102 may further equipped with the data store 122 and the analytic system 124. The data store 122 may be a reservoir of data received from the management controller 112 of the first external entity 104 and the management controller 116 of the second external entity 106. In some examples, the data store 122 may receive each update result of installation of firmware updates of the plurality of firmware updates on respective components of the hardware resource 110 from the management controller 112. In some examples, the data store 122 may receive each update result of installation of firmware updates of the plurality of firmware updates on respective components of the hardware resource 114, from the management controller 116. In examples described herein, the data store 122 may receive the update results from the management controller 112, the management controller 116, or both via RDA support application.

The analytic system 124 may be a computing system that analyze the update result of the installation of a firmware update on a component of the hardware resource for example the hardware resource 110 and represent an outcome of the analysis of the update result (or outcome of the update result). In such example, the analytic system 124 may determine the status of the component i.e., a failed component or a successful component, from the update result. In some examples, by determining the status of the component, the status of the corresponding firmware update may be identified. The outcome of the update result may include the status of the component after the execution of the installation. Furthermore, in some examples, the analytic system 124 may determine one or more of information including a number of instances of failure of the installation of the firmware update on the component, a failure log for each instance of failure or a reason of failure for each instance. In some examples, the analytic system 124 may represent the one or more of information including a number of instances of failure of the installation of the firmware update on the component, a failure log for each instance of failure or a reason of failure for each instance.

Figure 4:
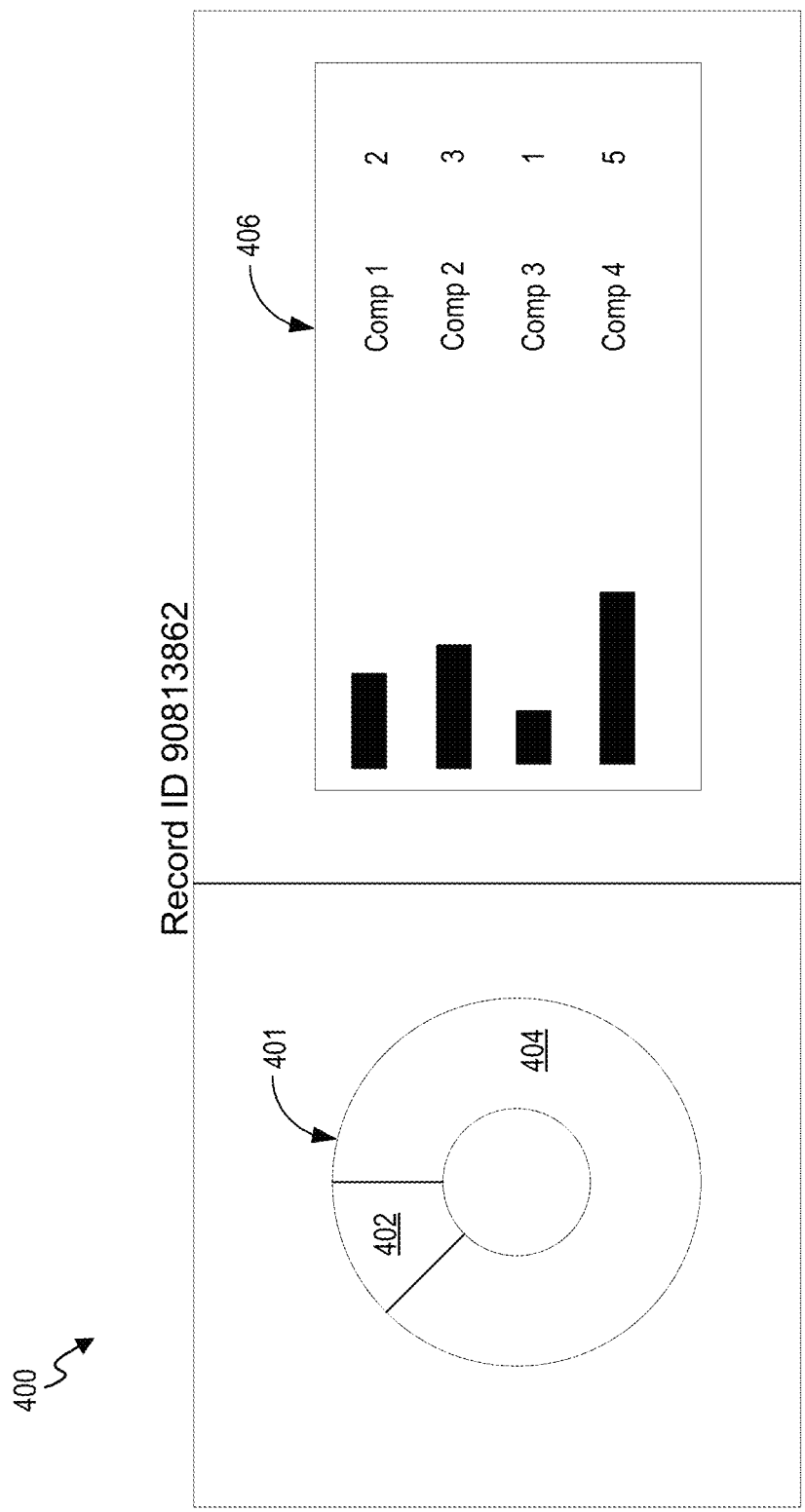
FIG. 4 illustrates a schematic view of an example dashboard.

In some examples described herein, the analytic system 124 may analyze update results of the installation of the firmware updates of the plurality of firmware updates in the firmware bundle 120 and represent a collective outcome (i.e., combination of various outcomes) of the update results. The collective outcome of the update results may include the status of various components in one or more hardware resources (e.g., 110, 114, or both). For example, the collective outcome of the update results may include a number of failed components with respect to a number of successful components in one or more hardware resource (110, 114 or both). In some examples, the collective outcome may include a percentage of failed components in the plurality of components. In some examples, the analytic system 124 may represent a dashboard that shows the collective outcome of the update results in form of a chart, table, graph, text, drawing, diagram and the like. In addition, the dashboard may further represent the one or more information including a number of instances of failure of the installation of each failed firmware update on respective component or a reason of failure for each instance. FIG. 4 shows an example of such a dashboard.

In some examples, the analytic system 124 may represent real-time collective outcome of the update results. That is, the collective outcome, at an instant, may be based on available update result(s) of the installation of firmware updates from various external entities, at that instant. Such representation of collective outcomes would be helpful to view real-time status (i.e., failed component or successful component) of the components of various hardware resources located at various external entities during or after the installation of firmware updates of a firmware bundle. Such representation of real-time status of components of various hardware resources may enable to identify real-time status of firmware updates (i.e., failed or successful firmware update) in a firmware bundle and visualize the overall quality of the firmware bundle. By identifying the failed component, in such examples, a related issue or error may be resolved in a timely manner.

Figure 2:
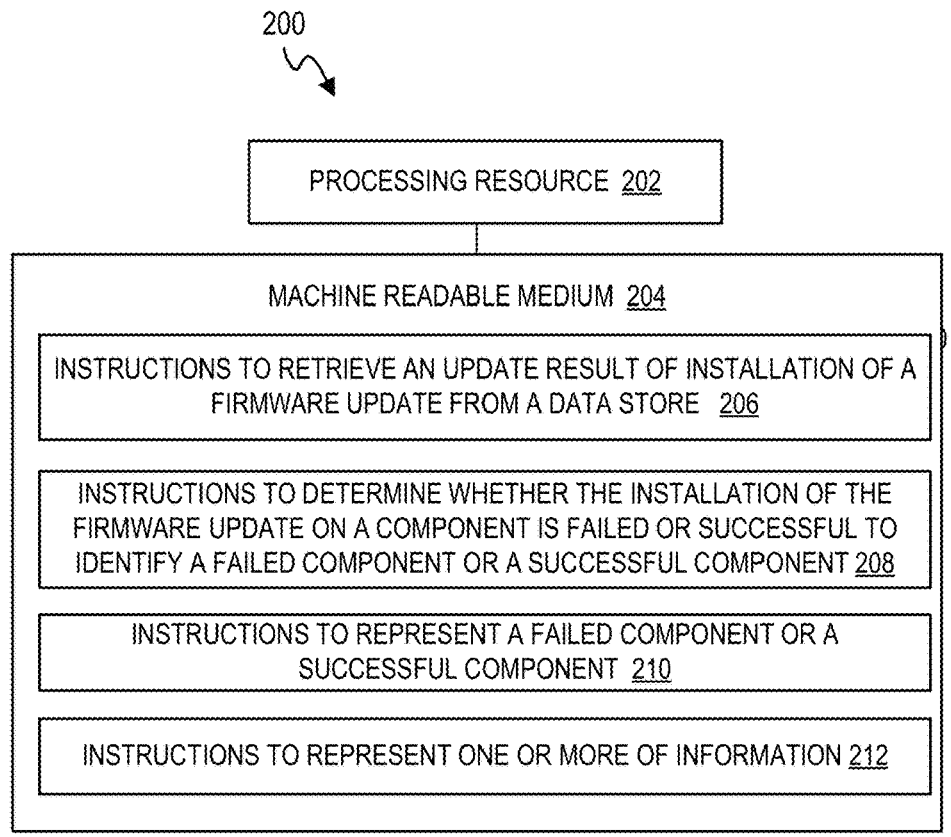
FIG. 2 is a block diagram of an example analytic system with a computer readable storage medium including instructions of an analytic application executable by a processing resource for analyzing and representing an update result of installation of a firmware update.

FIG. 2 is an example block diagram 200 depicting a processing resource 202 and a machine readable medium 204 encoded with example instructions of the analytic application to represent an update result of installation of a firmware update, in accordance with an example. The machine readable medium 204 is non-transitory and is alternatively referred to as a non-transitory machine readable medium. In some examples, the machine readable medium 204 may be accessed by the processing resource 202. The processing resource 202 and the machine readable medium 204 may be included in a system, for example an analytic system 124.

The machine readable medium 204 may be encoded with example instructions 206, 208, 210, and 212. The instructions 206, 208, 210, and 212 of FIG. 2, when executed by the processing resource 202, may implement various aspects of representing the update results. In particular, the instructions 206, 208, 210, and 212 of FIG. 2 may be useful for performing the functionalities of the analytic system 124 and the methods described below with respect to FIGS. 3-4.

The instructions 206, when executed by a processing resource such as processing resource 202, may cause the analytic system 124 to retrieve an update result of installation of a firmware update on a component of the hardware resource 110 of the first external entity 104, from a data store 122. In some examples, the data store 122 may receive the update results from the management controller 112 of the first external entity 104 through RDA support application. In such examples, the analytic system 124 may receive a notification, from the data store 122, on receipt of the update result of installation of the firmware update on the component of the hardware resource 110. On receipt of such notification, the instructions 206 may cause the analytic system 124 to retrieve the update result from the data store 122. The instructions 208, when executed by a processing resource such as processing resource 202, may cause the analytic system 124 to determine whether the installation of the firmware update on the component is failed or succeeded. In such example, the instructions 208 may include instructions to determine each instance of failure or success of the installation of the firmware update to determine whether the installation of the firmware update on the component is failed or succeeded. Accordingly, the instructions 208, when executed by a processing resource such as processing resource 202, may cause the analytic system 124, to determine whether the installation of the firmware update on the component is failed or succeeded to identify a failed component or a successful component. In such examples, by identifying the status of the component (i.e., failed component or successful component), a status of the corresponding firmware update (i.e., failed firmware update or successful firmware update) may be identified.

In some examples, the instructions 208 may include instructions to determine each instance of failure or success of the installation of the firmware updates of the plurality of firmware updates on respective components of the hardware resource 110 to determine failed components, successful components, or combinations thereof of the hardware resource 110.

The instructions 210, when executed by a processing resource such as processing resource 202, may cause the analytic system 124 to represent the failed component or the successful component. In some examples, an outcome of the update result that includes the status of the component (i.e., the failed component or the successful component). In an example, the analytic system 124 may display the status of the component. In such examples, the analytic system 124 may display a dashboard that shows the outcome of the update result. In some examples, the analytic system 124 may represent the outcomes of the update results of the installation of the plurality of firmware updates in the firmware bundle 120 on respective components of the hardware resource 110. In these examples, the analytic system 124 may represent a number of failed components and a number of successful components.

Furthermore, the instructions 212, when executed by a processing resource such as processing resource 202, may cause the analytic system 124 to represent one or more of information including a number of instances of failure of the installation of the firmware update on the component, a failure log for each instance of failure or a reason of failure for each instance, in response of determining that the installation of the firmware update on the component is failed. In some examples, the set of instructions may further include instructions 214. The instructions 214, when executed by a processing resource such as processing resource 202, may cause the analytic system 124 to inform a second external entity 106 about the failure of the firmware update (i.e., failed firmware update), in response of determining that the installation of the firmware update on the component is failed. The second external entity 106 may be informed while or before selecting the corresponding firmware update for the installation. In some examples, a customer advisory may further be provided to the second external entity 106 while or before selecting, by the second external entity, the firmware update (i.e., the failed firmware update) for the installation.

Figure 3:
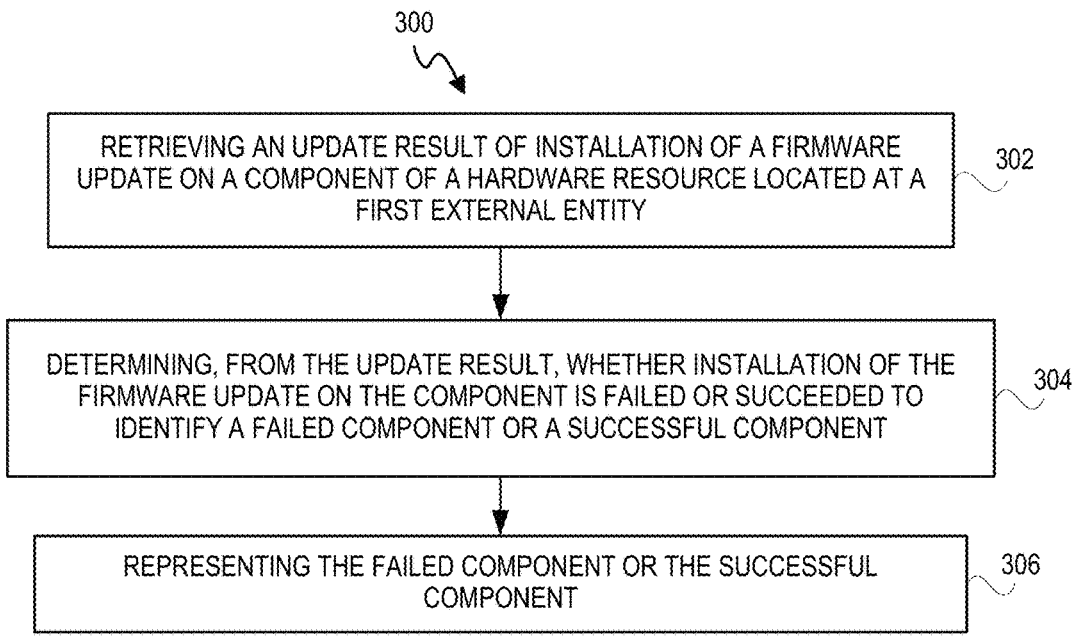
FIG. 3 is a flowchart of an example method for representing an update result of installing a firmware update.

The instructions 206-212 may include various instructions to execute at least a part of the methods described in FIGS. 3-4 (described later). Also, although not shown in FIG. 2, the machine readable medium 204 may also include additional program instructions to perform various other method blocks described in FIGS. 3-4. FIGS. 3-4 depict flowcharts of example methods 300 and 400 for representing an outcome of installation of a firmware bundle on a hardware resource, in various examples. In some examples, the methods 300 and 400 may be performed by the analytic system 124. For ease of illustration, the execution of methods 300 and 400 are described in details below with reference to FIG. 1. Although the below description is described with reference to the analytic system 124 of FIG. 1 and FIG. 2, however other applications or devices suitable for the execution of methods 300 and 400 may be utilized. Additionally, implementation of methods 300 and 400 is not limited to such examples. Although the flowcharts of FIGS. 3-4, individually, show a specific order of performance of certain functionalities, methods 300 and 400 are not limited to such order. For example, the functionalities shown in succession in the flowcharts may be performed in a different order, may be executed concurrently or with partial concurrence, or a combination thereof.

Although the methods 300 and 400 may be described with reference to installation of a firmware update on a component of one hardware resource located at one external entity, the described techniques may be utilized for installation of firmware updates on several components of multiple hardware resources located at various external entities. Additionally, implementation of methods 300 and 400 is not limited to such examples. Moreover, the installation of a firmware bundle (that include a plurality of firmware updates) on a hardware resource may include installation of firmware updates of the plurality of firmware updates on respective components of the plurality of components of the hardware resource.

The method block 302, of the method 300 may include retrieving an update result of installation of a firmware update of the firmware bundle 120 on a component of the hardware resource 110 located at the first external entity 104. In an example, the analytic system 124 may retrieve the update result. In some examples, the update result may be retrieved from the data store 122. The data store 122 may receive the update results from the management controller 112 located at the first external entity 104. The management controller 112 may send the update results to the data store 122 as permitted by the first external entity 104. In an example, the management controller 112 may send the update result via RDA support application. The data store 122 may receive the update result from the management controller 112 and store it. In an example, the analytic system 124 may receive a notification from the data store 122 on receipt of the update result from the management controller 112. On receiving the notification, the analytic system 124 may retrieve the update result from the data store 122. As alluded in above examples, the update result may include log files of each instance of failure or success of performing the installation of each firmware update on respective components of the hardware resource 110.

The method block 304, of the method 300 may include determining, by the analytic system 124, from the update results whether the installation of the firmware update on the component is failed or succeeded. In an example, the method block 340, of the method 300 may include determining each instances of failure or success of the installation of the firmware update on the component to determine whether installation of the firmware update on the component is failed or succeeded. In an example, the installation of the firmware update on the component may be succeeded after one or more attempts. In such example, the firmware update of the component may be successful. In another example, the installation of the firmware update on the component may be failed after each attempt of the one or more attempts. In such example, the firmware update of the component may be failed. By determining whether the installation of the firmware update on the component is failed or succeeded, the analytic system 124 may identify the status of the component i.e., the failed component or the successful component. In some examples, the analytic system 124 may identify the successful update of the component. In such examples, the analytic system 124 may determine a success log corresponding to the instance of success, from the update result. In some other examples, the analytic system 124 may identify the failed update of the component. In such examples, the method block 304, of the method 300 may include determining one or more of information including a number of instances of failure of the installation of the firmware update on the component, a failure log for each instance of failure or a reason of failure for each instance. In some examples, the one or more of information may be determined by the analytic system 124 from the update result.

The method block 306, of the method 300 may include representing the outcome of the update result. In some examples, representing the outcome may include representing the failed component or the successful component. In some examples, the failed component or the successful component may be represented by the analytic system 124. In addition, in some examples, the method 300 may further include representing, by the analytic system 124, the one or more of information determined by the analytic system 124, in response of determining that the installation of the firmware update on the component is failed. In one example, the one or more of information may include a number of instances of failure of the installation of the firmware update on the component, a failure log for each instance of failure or a reason of failure for each instance. In some examples, representing may include displaying the outcome of the update result. In some of such examples, the outcome may be represented in form of a chart, table, graph, text, drawing, diagram and the like. In some examples, the outcome may be displayed on a dashboard (for example, as shown in FIG. 4). In some other examples, the outcome may be downloaded in form of Excel, csv, pdf, or docx.

In some examples, the method block 306 of the method 300 may include representing a collective outcome of update results of the installation of the plurality of firmware updates of the firmware bundle 120 on respective components of the hardware resources at various external entities. The collective outcome may include combined outcomes of each update result of the installation of the plurality of firmware updates of the firmware bundle 120 on respective components of the hardware resources. In such examples, the analytic system 124 may combine the outcomes of the update results and builds aggregate number of failed and successful instances of identical components at different external entities.

FIG. 4 shows an example of representing a collective outcome on a dashboard. In this example, updates results of installation of a firmware bundle on the servers (server 1, server 2, server 3, server 4, and server 5) located at datacenters five different customers may be collected by a hardware vendor in a data store. Each server 1-5 may include identical components. An analytic system (for example, the analytic system 124) at the hardware vendor may retrieve the updates results of the installation of the firmware bundle on the servers 1-5 of each five different customers. The analytic system may read the log files of each instance of failure or success of the installation of each firmware update on respective component of servers 1-5 and build data (i.e., collective outcome) by aggregating number of success and failure instances of identical components at different five servers 1-5. The analytic system may store the variables and draw a dashboard 400 that represents the collective outcome as shown in FIG. 4. FIG. 4 shows a chart in form of a donut 401 that represents total number of components present in servers 1-5. The donut 401 may be an aggregation of instance of success and failures of the installation of firmware updates on the respective components at the servers 1-5. A first portion 402 of the donut 401 may show a percentage of failed components and a second portion 404 of the donut 401 may show a percentage of successful components. In some examples, the donut 401 may not have the first portion 402 i.e., there are no failed components. In such examples, the dashboard 400 shows good quality of the firmware bundle. In the example shown herein, the donut 401 may show the first portion 402, which shows that there are some failed components. In such examples, the dashboard further shows details of the failed components in servers 1-5 as shown by a table 406 in FIG. 4. As represented in the dashboard 400, the table 406 shows the number of failures of the installation of respective firmware updates on failed components (comp 1, comp 2, comp 3 and comp 4). The table 406 may further show the reason of each failure.

By representing the collective outcome (for example, as shown in FIG. 4), it may be easy to view the failed components of one or more hardware resources, the number of instances of failure of the installation of a component, and reasons of failure of the installation for each failed component. Some other information for example, location of a hardware resource that include a failed component etc. may also be viewed or identified from the representation.

In some examples, in repose of determining that the installation of the firmware update on the component is failed, the method 300 may further include tagging the corresponding firmware update. Tagging may be performed by the analytic system 124 or the source entity 102. Such tagging may be helpful for the source entity 102 or an external entity for example, the second external entity 106 to recognize a failed firmware update in a firmware bundle. In some examples, a customer advisory may be attached along with the tag. The customer advisory may provide one or more solutions to resolve an issue or error that may arise during the execution of the installation of the firmware update on a component of another hardware resource.

Figure 5:
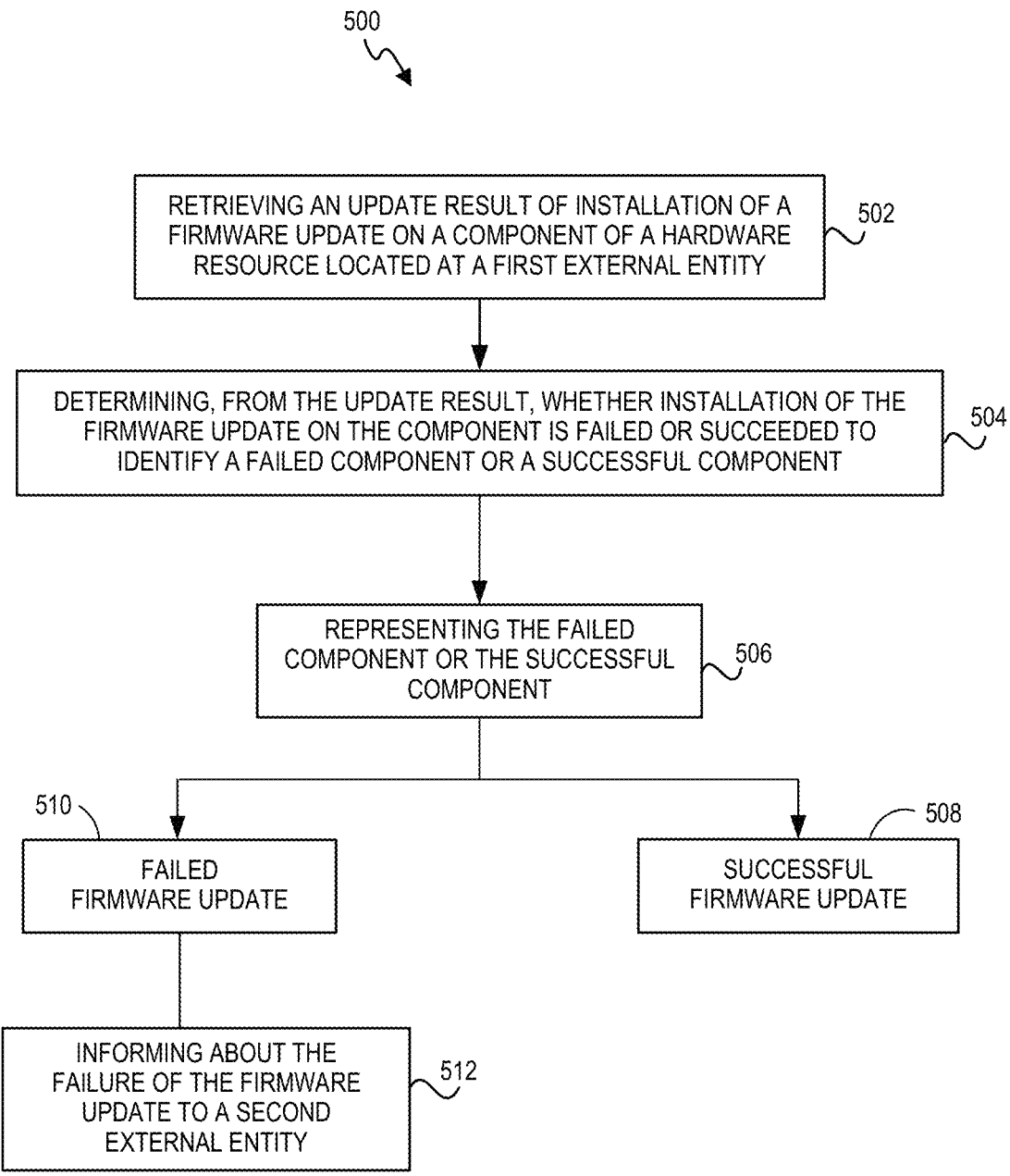
FIG. 5 is a flowchart of an example method that includes informing a second external entity about a failed firmware update determined from an update result of installation of a firmware update.

FIG. 5 depicts a flowchart of an example method 500 for representing an outcome of an update result of installation of a firmware bundle 120 on a hardware resource 110 of the first external entity 104, in some examples. The method blocks 502, 504 and 506 may be analogous, respectively, to method blocks 302, 304 and 306 of FIG. 3. On representing the failed update of the component or the successful update of the component, as described herein, the method 500 may include identifying a status of corresponding firmware update i.e., a successful firmware update (at method block 508) or a failed firmware update (at method block 510), in the firmware bundle 120.

In some examples, the method 500 may represent the collective outcome of the update results. The representation (for example, as shown in FIG. 4) may show one or more failed firmware updates in the firmware bundle 120, and the one or more information including a number of instances of failure of the installation of the firmware update on the component, a failure log for each instance of failure or a reason of failure for each instance. This way, the representation may help in visualizing the quality of the firmware bundle 120.

In some examples, in response of determining that the installation of the firmware update is failed, the method block 512 of the method 500 may include informing the second external entity 106 about the failure of the firmware update (i.e., failed firmware update) while or before selecting the firmware update (or the firmware bundle 120) by the second external entity 106. In an example, the analytic system 124 may indicate the failed firmware update in the firmware bundle 120 while or before the second external entity 106 selects the firmware bundle 120 for installing firmware updates on the components of the hardware resource 114 of the second external entity 106. In some examples, a customer advisory may also be provided to the second external entity 106 while informing or indicating the failed firmware update.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A method for representing update results of installation of a firmware bundle on a hardware, comprising:
retrieving, by an analytic system, an update result of installation of a firmware update of the firmware bundle on a component of a hardware resource located at a first external entity, wherein the update result comprises metadata of each instance of failure or success of the installation of the firmware update on the component;
from the update result, determining, by the analytic system, whether the installation of the firmware update on the component is failed or succeeded to identify a failed update or a successful update of the component;
representing, by the analytic system, a status of the failed update or the successful update of the component; and
in response of determining that the installation of the firmware update on the component is failed, informing, by the analytic system, about the failure of the firmware update to a second external entity while or before selecting, by the second external entity, the corresponding firmware update for installation.

2. The method of claim 1, wherein determining comprises determining each instances of failure or success of the installation of the firmware update on the component to determine whether installation of the firmware update on the component is failed or succeeded.

3. The method of claim 2, further comprising:
in response of determining that the installation of the firmware update on the component is failed, representing, by the analytic system, one or more of information comprising a number of instances of failure of the installation of the firmware update on the component, a failure log for each instance of failure or a reason of failure for each instance.

4. The method of claim 1, further comprising:
in response of determining that the installation of the firmware update on the component is failed, tagging the corresponding firmware update.

5. The method of claim 1, further comprising tagging the corresponding firmware update with a customer advisory.

6. The method of claim 1, further comprising providing, by the analytic system, a customer advisory to the second external entity while informing.

7. The method of claim 1, wherein retrieving the update result comprises retrieving the update result from a data store that receives the update result from the first external entity.

8. The method of claim 7, further comprising receiving, by the analytic system, a notification, from the data store, on receipt of the update result by the data store from the first external entity.

9. The method of claim 1, wherein representing comprises displaying the failed update or the successful update of the component at a dashboard.

10. The method of claim 1, wherein the metadata of each instance comprises metadata of the component.

11. The method of claim 1, comprising:
retrieving, by the analytic system, update results of installation of each firmware update of a plurality of firmware updates in the firmware bundle on a respective component of a plurality of components of the hardware resource located at the first external entity;
from the update results, determining, by the analytic system, whether the installation of each firmware update on the respective component is failed or succeeded to identify one or more failed updates of the plurality of components, one or more successful updates of the plurality of components, or combinations thereof; and
representing, by the analytic system, the status of the one or more failed updates of the plurality of components, the one or more successful updates of the plurality of components or combinations thereof.

12. An analytic system comprising:
a processing resource; and
a non-transitory processor readable medium encoded with instructions of an analytic application executable by the processing resource to cause the processing resource to:
retrieve, from a data store, an update result of installation of a firmware update on a component of a hardware resource located at a first external entity, wherein the update result comprises metadata of each instance of failure or success of the installation of the firmware update on the component;
determine, from the update result, whether the installation of the firmware update on the component is failed or succeeded to identify a failed update or a successful update of the component;
represent a status of the failed update or the successful update of the component; and
in response of determining that the installation of the firmware update on the component is failed, represent one or more of information comprising a number of instances of failure of the installation of the firmware update on the component, a failure log for each instance of failure or a reason of failure for each instance and inform about the failure of the firmware update to a second external entity while or before selecting, by the second external entity, the corresponding firmware update for installation.

13. The analytic system of claim 12, further comprising instructions executable by the processing resource to cause the processing resource to:
in response of determining that the installation of the firmware update on the component is failed, tag the corresponding firmware update.

14. The analytic system of claim 12, further comprising instructions executable by the processing resource to cause the processing resource to:
in response of determining that the installation of the firmware update on the component is failed, provide a customer advisory to the second external entity while informing.

15. The analytic system of claim 12, wherein the instructions to retrieve comprise instructions to retrieve the update results from a data store.

16. The analytic system of claim 15, further comprising instructions executable by the processing resource to cause the processing resource to receive a notification, from the data store, on receipt of the update result by the data store from the first external entity.

17. The analytic system of claim 12, further comprising instructions executable by the processing resource to cause the processing resource to:
retrieve update results of installation of a plurality of firmware updates of a firmware bundle on respective components of a plurality of components of the hardware resource located at the first external entity;

from the update results, determine whether the installation of each firmware update on the respective component is failed or succeeded to identify one or more failed updates of the plurality of components, one or more successful updates of the plurality of components, or combinations thereof; and represent the status of the one or more failed updates of the plurality of components, the one or more successful updates of the plurality of components or combinations thereof.

18. A non-transitory processor readable medium encoded with instructions executable by the processing resource to cause the processing resource to:

retrieve, from a data store, an update result of installation of a firmware update on a component of a hardware resource located at a first external entity, wherein the update result comprises metadata of each instance of failure or success of the installation of the firmware update on the component;

determine, from the update result, whether the installation of the firmware update on the component is failed or succeeded to identify a failed update or a successful update of the component;

represent a status of the failed update or the successful update of the component; and in response of determining that the installation of the firmware update on the component is failed, inform about the failure of the firmware update to a second external entity while or before selecting, by the second external entity, the corresponding firmware update for installation.

19. The method of claim 1, wherein the second external entity comprises a hardware resource type that is the same as the hardware resource located at the first external entity, wherein the first external entity and the second external entity belong to different datacenters in separate locations.

20. The method of claim 4, wherein the tagging the corresponding firmware update causes the second external entity to recognize the failure of the corresponding firmware update.

\* \* \* \* \*